United States Patent [19]

Siegenthaler

[11] Patent Number: 5,472,555

[45] Date of Patent: Dec. 5, 1995

[54] TRANSFER DEVICE FOR A RADIAL TIRE SECOND STAGE ASSEMBLY

[75] Inventor: Karl J. Siegenthaler, Roma - Ostia, Italy

[73] Assignee: Bridgestone Corporation, Tokyo, Japan

[21] Appl. No.: 342,466

[22] Filed: Nov. 21, 1994

[30] Foreign Application Priority Data

Dec. 21, 1993 [IT] Italy .................... TO93A0980

[51] Int. Cl.$^6$ .................................. B29D 30/26
[52] U.S. Cl. ............... 156/406.2; 156/396; 156/407
[58] Field of Search ..................... 156/406.2, 126, 156/405.1, 396, 111, 127, 421.8, 407

[56] References Cited

U.S. PATENT DOCUMENTS 4,093,495  6/1978  Colombani ............... 156/406.2
4,204,903  5/1980  Alexander ................. 156/126
4,584,049  4/1986  Mukae et al. ............. 156/406.2
5,156,713  10/1992  Ishii et al. ............... 156/396

FOREIGN PATENT DOCUMENTS 82633  6/1980  Japan ..................... 156/126

Primary Examiner—Geoffrey L. Knable
Attorney, Agent, or Firm—Carmen S. Santa Maria

[57] ABSTRACT

A transfer device (1) for the second stage assembly (2) of a radial tire. The device presents two pairs (33) of horizontal-axis rollers (37) defining a saddle (29) for supporting a toroidal body (4) positioned with a first axis (5) parallel to the axes (35) of the rollers (37) and housing the second stage assembly (2). The pairs (33) of rollers (37) are mounted on a platform (25) for rotating the toroidal body (4) about a second vertical axis (20), and are operable for rotating the toroidal body (4) about the first axis (5), and are located an adjustable distance apart for moving the toroidal body (4) along the second axis (20).

6 Claims, 4 Drawing Sheets

5,472,555

TRANSFER DEVICE FOR A RADIAL TIRE SECOND STAGE ASSEMBLY

BACKGROUND OF THE INVENTION

1. Technical Field

The present invention relates to a transfer device for a radial tire second stage assembly.

2. Background Information

According to European Patent Application publication no. 0540048 filed by the present Applicant, a radial tire is produced by forming the second stage assembly of the tire on the inner surface of a toroidal body; separately forming the first stage assembly of the tire on inner rings supporting the bead portions of the first stage assembly; placing the first stage assembly inside the toroidal body and on the inner surface of the second stage assembly; forming the sidewalls of the tire, which are placed on the first stage assembly; and assembling annular walls for connecting the toroidal body and inner rings and so forming a mold suitable for use as a curing mold.

The above assembly process involves continual, exact displacement of the second stage in relation to the first stage assembly.

SUMMARY OF THE INVENTION

It is an object of the present invention to provide a straightforward, low-cost, and at the same time relatively accurate, flexible device for performing all the above displacements.

According to the present invention, there is provided a transfer device for the second stage assembly of a radial tire. The device comprises a carriage; a toroidal body supported on the carriage and housing said second stage assembly; and means for guiding said carriage. The carriage comprises a saddle for supporting the toroidal body with a first axis arranged substantially horizontally; a platform rotating about a second substantially vertical axis and supporting the saddle; and adjusting means for varying the width of the saddle and moving the toroidal body along the second axis.

According to a preferred embodiment of the above device, the saddle comprises two roller means rotating about respective third substantially horizontal axes, and located a given distance apart; said adjusting means adjusting said distance within a given range.

Preferably, at least one of said roller means is powered, and each of said roller means comprises two coaxial rollers. The toroidal body presents two outer annular flanges, and each roller is engaged by a respective said outer annular flange.

BRIEF DESCRIPTION OF THE DRAWINGS

A non-limiting embodiment of the present invention will be described by way of example with reference to the accompanying drawings, in which.

DESCRIPTION OF THE PREFERRED EMBODIMENT

Figure 1:
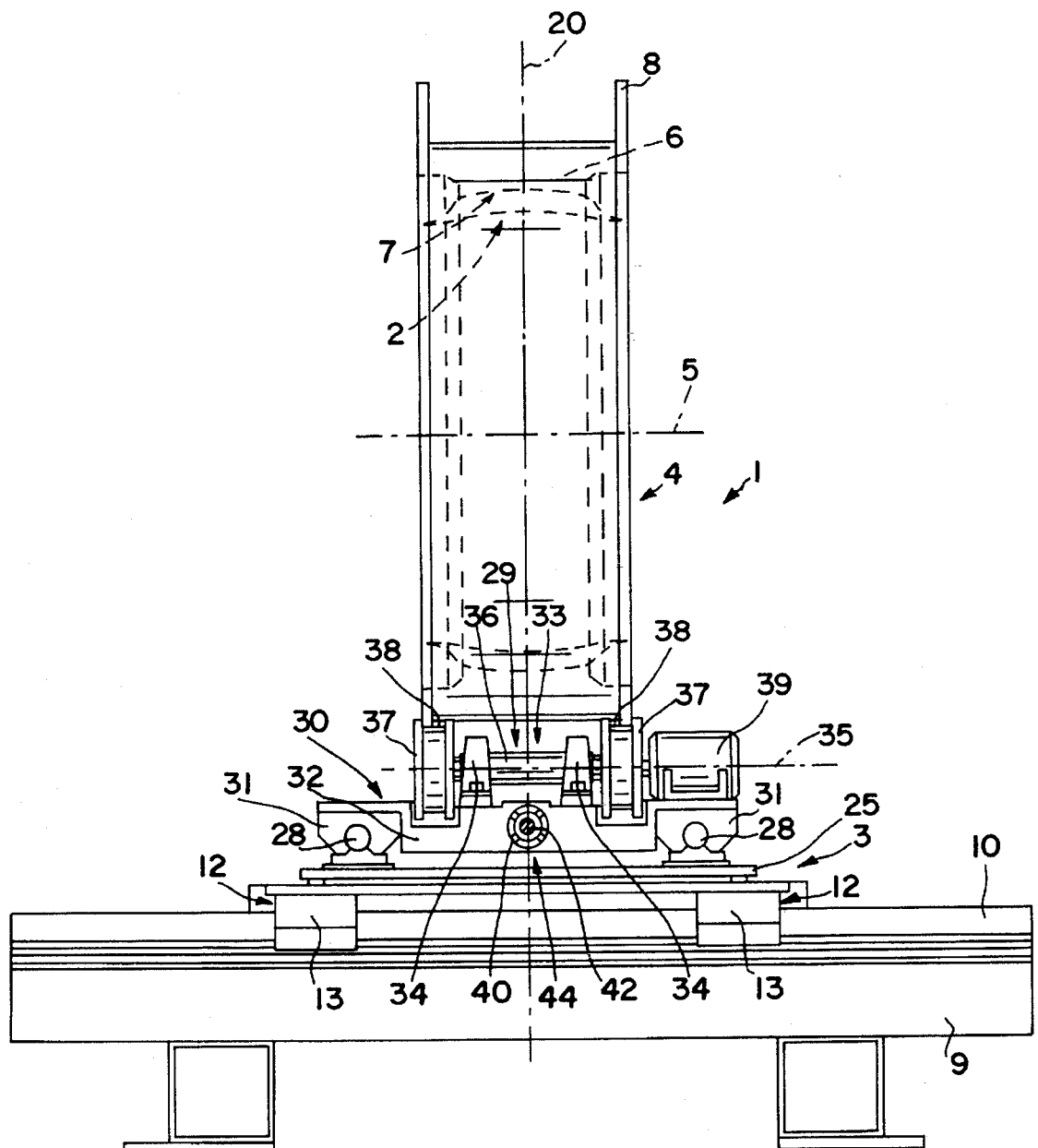
FIG. 1 shows a side view of a preferred embodiment of the device according to the present invention.

Number 1 in FIG. 1 indicates a transfer device for the second stage assembly 2 of a radial tire (not shown). Device 1 comprises a carriage 3; and a generally annular or toroidal body 4 supported on carriage 3 with its axis 5 arranged substantially horizontally, and in turn comprising an intermediate annular body 6 for housing assembly 2. Annular body 6 is externally cylindrical, and is defined internally by an annular surface 7 having a curved inwardly-concave section and designed to contact the outer surface of assembly 2. Toroidal body 4 also comprises two outer annular flanges 8 extending radially outwards from the opposite axial ends of annular body 6.

In addition to carriage 3 and toroidal body 4, device 1 also comprises a fixed frame 9, and two parallel rails 10 supported in a fixed position on frame 9 and in turn supporting carriage 3 in sliding manner.

Figure 2:
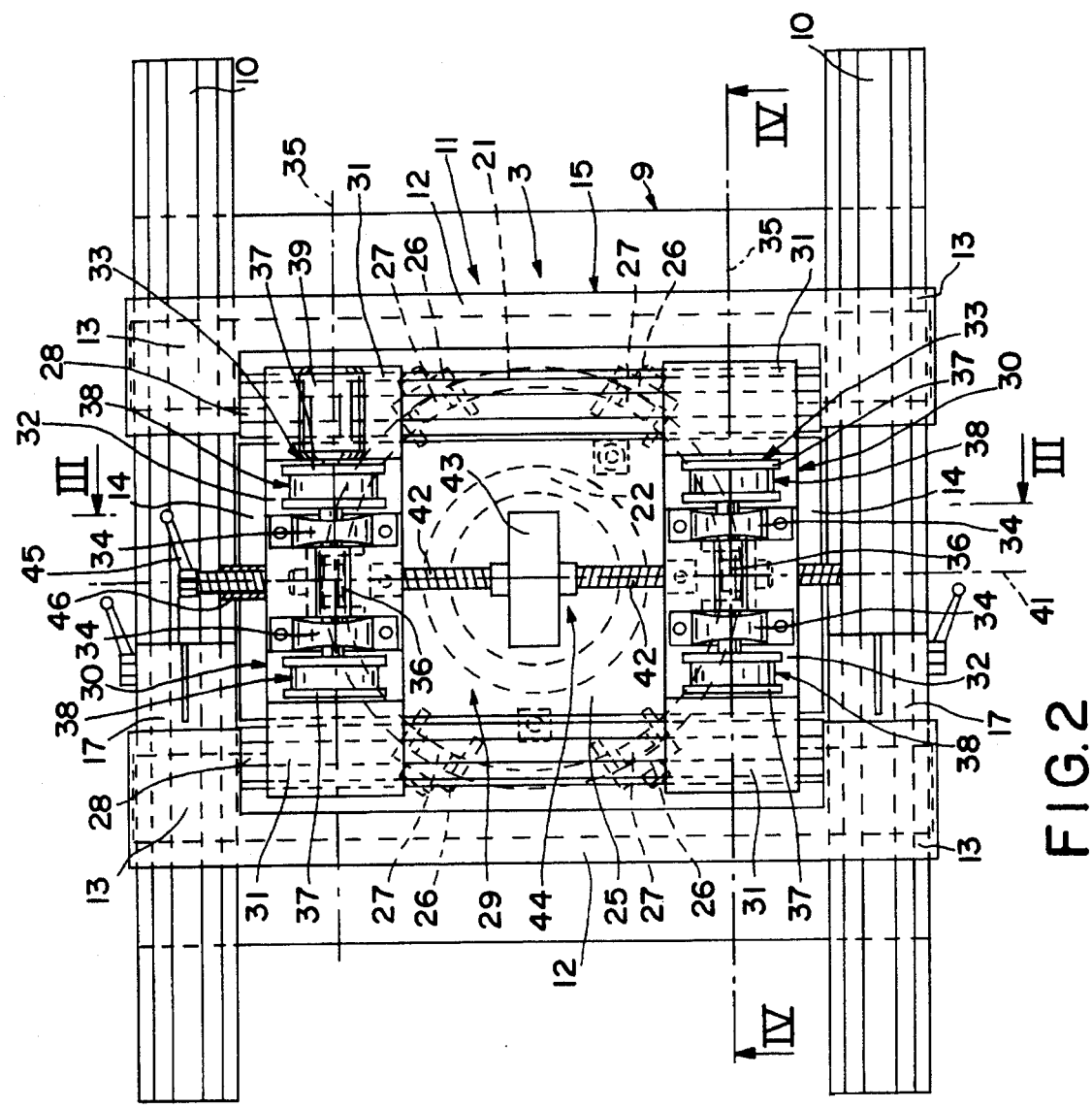
FIG. 2 shows a partially sectioned plan view, with parts removed for clarity, of the FIG. 1 device.
Figure 3:
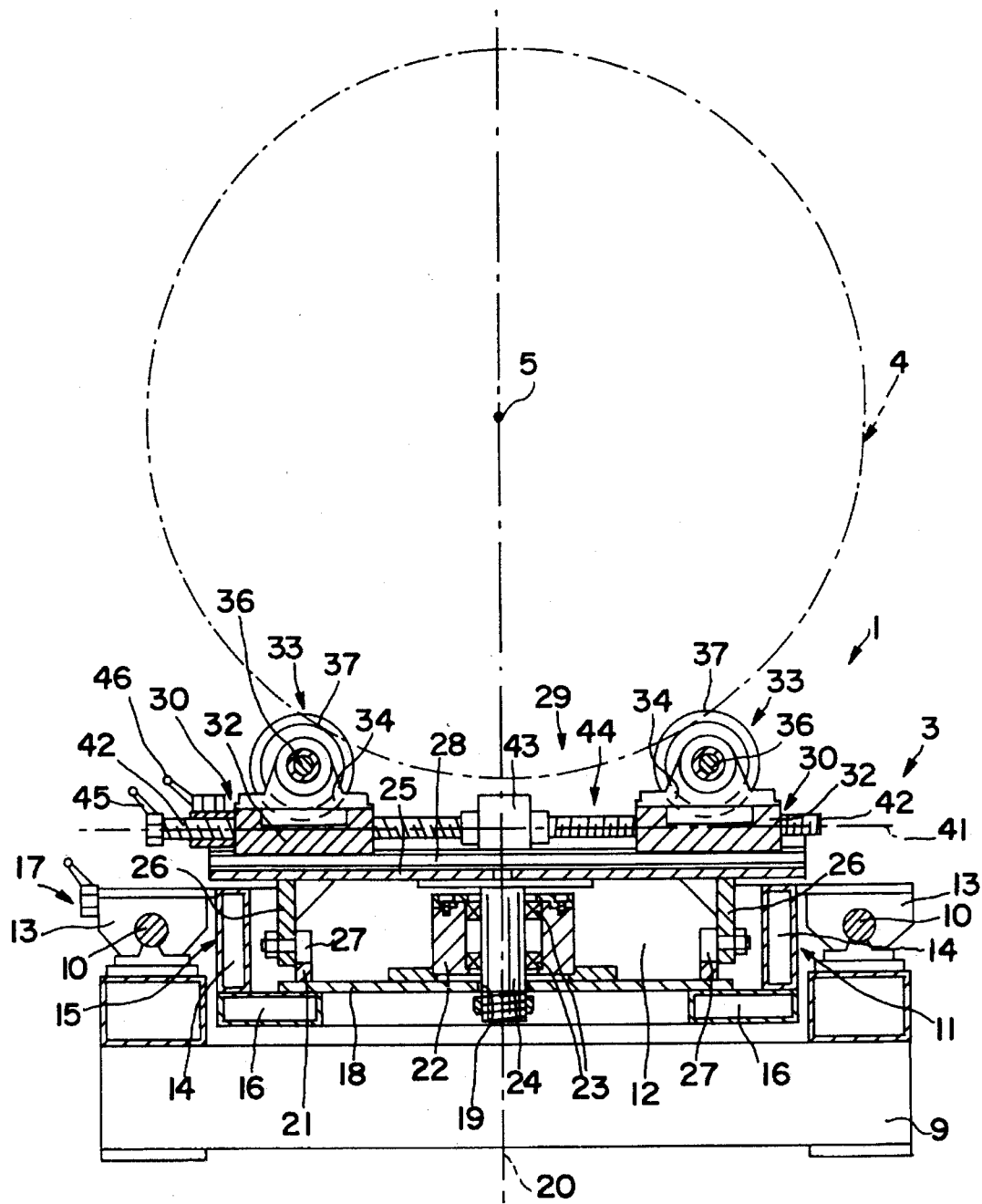
FIG. 3 shows a section along line III—III in FIG. 2.
Figure 4:
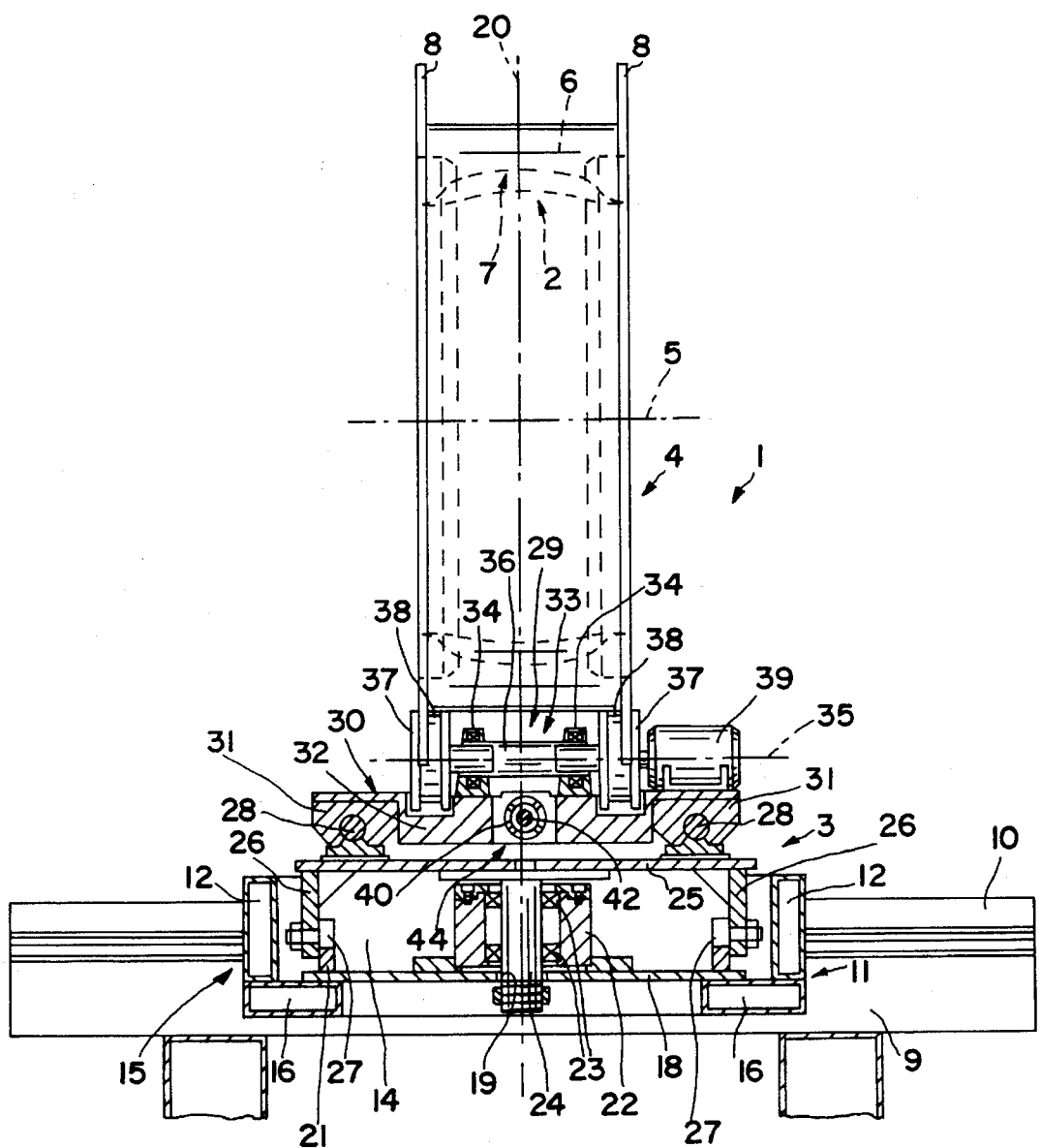
FIG. 4 shows a section along line IV—IV in FIG. 2.

As shown more clearly in FIGS. 2 and 4, carriage 3 comprises a base 11 in turn comprising two parallel cross members 12 perpendicular to rails 10, each presenting two end shoes 13 fitted in a sliding manner to rails 10. Cross members 12 are connected by two bars 14 parallel to rails 10, so as to define, with bars 14, a quadrilateral frame 15, from the bottom end of which horizontal platforms 16 project inwards. Base 11 also comprises two lock devices 17 for fixing base 11 to rails 10 in any given position. A horizontal plate 18 has opposite peripheral portions resting on and connected integral with platforms 16, and presents a central hole 19 with a vertical axis 20, and an upper annular rib 21 extending about hole 19 and coaxial with axis 20. Upwards from plate 18, there extends a tubular body 22 connected integral with plate 18, coaxial with axis 20 and hole 19, and which is engaged, together with hole 19 and via the interposition of radial bearings 23, by a pin 24 extending downwards from a substantially rectangular platform 25. From the bottom surface of platform 25, there extend downwards four brackets 26 equally spaced about axis 20, and each supporting a roller 27 running along an annular track coaxial with axis 20 and defined by the annular top end surface of rib 21.

The top surface of platform 25 is fitted integral with two substantially horizontal rails 28 symmetrical in relation to axis 20 and supporting in a sliding manner a saddle 29 in turn supporting toroidal body 4. Saddle 29 comprises two parallel cross members 30 perpendicular to rails 28, each presenting two end shoes 31 connected in a sliding manner to rails 28, and a horizontal platform 32 between shoes 31. The top surface of each platform 32 is fitted integral with a roller support 33 comprising two supports 34 aligned along a respective axis 35 parallel to respective cross member 30. Via the interposition of respective bearings, supports 34 support for rotation a shaft 36, the opposite ends of which project outwards of supports 34 and are fitted with respective rollers 37, each coaxial with a respective axis 35 and having a groove 38. One of shafts 36 may be connected to the output of a motor 39 supported on a respective shoe 31. As shown in Figure 4, the length of shafts 36 is such that the distance between grooves 38 on rollers 37 of each roller support 33 equals that between the two flanges 8.

As shown in FIGS. 2 and 4, cross members 30 are fitted through with respective nuts 40 coaxial with each other along an axis 41 extending transversely to axes 35, and engaged by respective oppositely threaded screws 42 connected at one end by a central block 43. Nuts 40 and screws 42 constitute a device 44 for adjusting the width of saddle 29 within a given range, and which presents an external control handle 45 fitted to one of the screws 42, and a releasable lock device 46 for preventing rotation of screws 42.

As shown in FIGS. 1 and 4, toroidal body 4 is placed on saddle 29 with each flange 8 engaged inside the grooves 38 of two rollers 37, so that it can be moved along its own axis 5 by moving carriage 3 along rails 10; rotated about axis 5 either manually or by means of motor 39; adjusted manually about axis 20 (or by means of a known motor, not shown, connected to pin 24); and moved, by means of device 44, transversely in relation to axis 5 and in the direction of axis 20.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A transfer device for a second stage assembly of a radial tire; the device comprising a carriage; an annular body having a first axis supported on the carriage for housing said second stage assembly; means for guiding said carriage in a direction of the first axis; said carriage comprising a saddle having two spaced-part supports for supporting the annular body with the first axis arranged substantially horizontally, a platform rotatable about a second substantially vertical axis and supporting the saddle, and adjusting means for varying the spacing between the spaced-apart supports of the saddle to move the annular body along the second axis.

2. A device as claimed in claim 1, further comprising a base connected to said guide means; the platform being mounted for rotation on the base.

3. A device as claimed in claim 1, in which the spaced-apart supports of the saddle comprise two roller means rotating about respective third substantially horizontal axes, and located a given distance apart; said adjusting means adjusting said distance within a given range.

4. A device as claimed in claim 3, in which at least one of said roller means is powered.

5. A device as claimed in claim 3, in which each of said roller means comprises two coaxial rollers; the toroidal body presenting two outer annular flanges; and each roller being engaged by a respective one of said outer annular flanges.

6. A device as claimed in claim 1, in which said adjusting means comprises a screw and nut.

* * * * *